US012675850B2

(12) United States Patent
Galeotti et al.

(10) Patent No.: US 12,675,850 B2
(45) Date of Patent: Jul. 7, 2026

(54) SYSTEM AND METHOD FOR REMOVING NOISE AND/OR ARTIFACTS FROM AN OCT IMAGE USING A GENERATIVE ADVERSARIAL NETWORK

(71) Applicant: Carnegie Mellon University, Pittsburgh, PA (US)

(72) Inventors: John Galeotti, Pittsburgh, PA (US); Tejas Sudharshan Mathai, Seattle, WA (US); Jiahong Ouyang, Stanford, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 314 days.

(21) Appl. No.: 17/618,190

(22) PCT Filed: Jun. 12, 2020

(86) PCT No.: PCT/US2020/037446
§ 371 (c)(1),
(2) Date: Dec. 10, 2021

(87) PCT Pub. No.: WO2020/252271
PCT Pub. Date: Dec. 17, 2020

(65) Prior Publication Data
US 2022/0245769 A1 Aug. 4, 2022

Related U.S. Application Data

(60) Provisional application No. 62/860,415, filed on Jun. 12, 2019.

(51) Int. Cl.
*G06T 5/70* (2024.01)
*G06N 3/045* (2023.01)
(Continued)

(52) U.S. Cl.
CPC ............... *G06T 5/70* (2024.01); *G06N 3/045* (2023.01); *G06T 7/0012* (2013.01); *G06T 7/194* (2017.01);
(Continued)

(58) Field of Classification Search
CPC ......... G06T 5/70; G06T 7/0012; G06T 7/194; G06T 2207/10101; G06T 2207/20081;
(Continued)

(56) References Cited

U.S. PATENT DOCUMENTS 10,430,946 B1 * 10/2019 Zhou ................... A61B 5/02007
2017/0109883 A1 * 4/2017 Lowry ...................... G06T 7/12
(Continued)

FOREIGN PATENT DOCUMENTS

WO 2018199031 A1 11/2018
WO 2019090213 A1 5/2019

OTHER PUBLICATIONS

Generative adversarial networks for specular highlight removal in endoscopic images (Year: 2018).*
Ouyang et al., "Accurate Tissue Interface Segmentation via Adversarial Pre-Segmentation of Anterior Segment OCT Images", Cornell University Library/Electrical Engineering and Systems Science/Image and Video Processing, May 7, 2019, 27 pages.
(Continued)

*Primary Examiner* — Jennifer Mehmood
*Assistant Examiner* — Pardis Sohraby
(74) *Attorney, Agent, or Firm* — The Webb Law Firm

(57) ABSTRACT
Systems, methods, and computer program products are provided for removing noise and/or artifacts from an image. The method includes training a generative adversarial network (GAN) based on a plurality of images, the plurality of images comprising at least one undesired element comprising at least one of the following: noise, speckle patterns, artifacts, or any combination thereof, and generating a modified image based on processing an image of an eye or other object with the GAN to remove the at least one
(Continued)

undesired element from the image that is above an outer surface of the eye or other object.

17 Claims, 6 Drawing Sheets

(51) Int. Cl.
  *G06T 7/00* (2017.01)
  *G06T 7/194* (2017.01)
  *G06V 10/774* (2022.01)

(52) U.S. Cl.
  CPC .................... *G06V 10/7747* (2022.01); *G06T 2207/10101* (2013.01); *G06T 2207/20081* (2013.01); *G06T 2207/20084* (2013.01); *G06T 2207/30041* (2013.01)

(58) Field of Classification Search
  CPC . G06T 2207/20084; G06T 2207/30041; G06T 7/12; G06T 7/174; G06N 3/045; G06N 3/047; G06N 3/08; G06V 10/7747
  USPC ........................................ 382/131
  See application file for complete search history.

(56) References Cited

U.S. PATENT DOCUMENTS

| | | | |
|---|---|---|---|
| 2017/0372193 A1 | 12/2017 | Mailhe et al. | |
| 2018/0293712 A1* | 10/2018 | Vogels | G06V 10/454 |
| 2019/0128989 A1* | 5/2019 | Braun | G06N 5/046 |
| 2019/0347797 A1* | 11/2019 | Bagherinia | G06T 7/0012 |
| 2020/0134876 A1* | 4/2020 | Park | G06F 18/214 |
| 2020/0178794 A1* | 6/2020 | El-Baz | A61B 3/1241 |
| 2020/0286208 A1* | 9/2020 | Halupka | G06N 3/047 |
| 2020/0294201 A1* | 9/2020 | Planche | G06F 18/2413 |
| 2022/0151490 A1* | 5/2022 | Jia | A61B 3/102 |

OTHER PUBLICATIONS

Edamoto et al., "Scene Classification from Corneal Surface Reflection Images Using Generative Adversarial Networks", Information Processing Society of Japan Research Report, 2019, 16 pages, vol. 2019-CVIM-217, No. 12 (English language machine translation).
Yu et al., "Generative Adversarial Networks With Dense Connection For Optical Coherence Tomography Images Denoising", 11th International Congress on Image and Signal Processing, BioMedical Engineering and Informatics, 2018, 5 pages.

* cited by examiner

102

SYSTEM AND METHOD FOR REMOVING NOISE AND/OR ARTIFACTS FROM AN OCT IMAGE USING A GENERATIVE ADVERSARIAL NETWORK

CROSS-REFERENCE TO RELATED APPLICATIONS

This application is the United States national phase of International Application No. PCT/US2020/037446 filed Jun. 12, 2020, and claims priority to U.S. Provisional Patent Application No. 62/860,415 filed Jun. 12, 2019, the disclosures of which are hereby incorporated by reference in their entirety.

BACKGROUND

1. Field

This disclosure relates generally to generative adversarial networks (GANs) and, in non-limiting embodiments, a system and method for removing noise and/or artifacts from an OCT image and/or segmenting ocular layers of an OCT image using a GAN.

2. Technical Considerations

Optical Coherence Tomography (OCT) is an imaging modality used in part to visualize corneal, limbal, and retinal structures with micrometer resolution. OCT can be used to estimate corneal biometric parameters, such as corneal curvature and refractive power, and it has been integrated into surgical microscopes for use in surgical procedures, such as cataract surgery, LASIK, and Deep Anterior Lamellar Keratoplasty (DALK). Accurate reconstruction of the cornea and estimation of these parameters for clinical use require precise delineation of corneal tissue interfaces, thereby aiding surgeons with their surgical planning. Existing image analysis-based corneal interface segmentation approaches do not generalize to volumes acquired from different OCT scanners. Rather, such existing approaches are ad hoc with key parameters being chosen manually.

SUMMARY

According to non-limiting embodiments or aspects, provided is a method for removing noise and/or artifacts from an image, comprising: training a generative adversarial network (GAN) based on a plurality of images, the plurality of images comprising at least one undesired element comprising at least one of the following: noise, speckle patterns, artifacts, or any combination thereof; and generating a modified image based on processing an image of an eye or other object with the GAN to remove the at least one undesired element from the image that is above an outer surface of the eye or other object.

In non-limiting embodiments or aspects, generating the modified image comprises identifying a plurality of background pixels corresponding to the at least one undesired element. In non-limiting embodiments or aspects, the GAN is configured to assign different weights to foreground pixels and background pixels. In non-limiting embodiments or aspects, the background pixels are weighed more than the foreground pixels. In non-limiting embodiments or aspects, the plurality of images comprise a plurality of Optical Coherence Tomography (OCT) images. In non-limiting embodiments or aspects, the plurality of OCT images is from a plurality of different OCT imaging systems. In non-limiting embodiments or aspects, the outer surface comprises a shallowest tissue interface of the eye. In non-limiting embodiments or aspects, the modified image comprises a pre-segmented image. In non-limiting embodiments or aspects, the method further includes processing the pre-segmented image with at least one segmentation algorithm.

According to non-limiting embodiments or aspects, provided is a system for removing noise and/or artifacts from an image, comprising a computing device programmed or configured to: train a generative adversarial network (GAN) based on a plurality of images, the plurality of images comprising at least one undesired element comprising at least one of the following: noise, speckle patterns, artifacts, or any combination thereof; and generate a modified image based on processing an image of an eye or other object with the GAN to remove the at least one undesired element from the image that is above an outer surface of the eye or other object.

In non-limiting embodiments or aspects, generating the modified image comprises identifying a plurality of background pixels corresponding to the at least one undesired element. In non-limiting embodiments or aspects, the GAN is configured to assign different weights to foreground pixels and background pixels. In non-limiting embodiments or aspects, the background pixels are weighed more than the foreground pixels. In non-limiting embodiments or aspects, the plurality of images comprise a plurality of Optical Coherence Tomography (OCT) images. In non-limiting embodiments or aspects, the plurality of OCT images is from a plurality of different OCT imaging systems. In non-limiting embodiments or aspects, the outer surface comprises a shallowest tissue interface of the eye. In non-limiting embodiments or aspects, the modified image comprises a pre-segmented image. In non-limiting embodiments or aspects, the computing device is further programmed or configured to process the pre-segmented image with at least one segmentation algorithm.

According to non-limiting embodiments or aspects, provided is a computer program product for removing noise and/or artifacts from an image, comprising a computing device programmed or configured to: train a generative adversarial network (GAN) based on a plurality of images, the plurality of images comprising at least one undesired element comprising at least one of the following: noise, speckle patterns, artifacts, or any combination thereof; and generate a modified image based on processing an image of an eye or other object with the GAN to remove the at least one undesired element from the image that is above an outer surface of the eye or other object.

Further non-limiting embodiments or aspects are set forth in the following numbered clauses:

Clause 1: A method for removing noise and/or artifacts from an image, comprising: training a generative adversarial network (GAN) based on a plurality of images, the plurality of images comprising at least one undesired element comprising at least one of the following: noise, speckle patterns, artifacts, or any combination thereof; and generating a modified image based on processing an image of an eye or other object with the GAN to remove the at least one undesired element from the image that is above an outer surface of the eye or other object.

Clause 2: The method of clause 1, wherein generating the modified image comprises identifying a plurality of background pixels corresponding to the at least one undesired element.

Clause 3: The method of clauses 1 or 2, wherein the GAN is configured to assign different weights to foreground pixels and background pixels.

Clause 4: The method of any of clauses 1-3, wherein the background pixels are weighed more than the foreground pixels.

Clause 5: The method of any of clauses 1-4, wherein the plurality of images comprise a plurality of Optical Coherence Tomography (OCT) images.

Clause 6: The method of any of clauses 1-5, wherein the plurality of OCT images is from a plurality of different OCT imaging systems.

Clause 7: The method of any of clauses 1-6, wherein the outer surface comprises a shallowest tissue interface of the eye.

Clause 8: The method of any of clauses 1-7, wherein the modified image comprises a pre-segmented image.

Clause 9: The method of any of clauses 1-8, further comprising processing the pre-segmented image with at least one segmentation algorithm.

Clause 10: A system for removing noise and/or artifacts from an image, comprising a computing device programmed or configured to: train a generative adversarial network (GAN) based on a plurality of images, the plurality of images comprising at least one undesired element comprising at least one of the following: noise, speckle patterns, artifacts, or any combination thereof; and generate a modified image based on processing an image of an eye or other object with the GAN to remove the at least one undesired element from the image that is above an outer surface of the eye or other object.

Clause 11: The system of clause 10, wherein generating the modified image comprises identifying a plurality of background pixels corresponding to the at least one undesired element.

Clause 12: The system of clauses 10 or 11, wherein the GAN is configured to assign different weights to foreground pixels and background pixels.

Clause 13: The system of any of clauses 10-12, wherein the background pixels are weighed more than the foreground pixels.

Clause 14: The system of any of clauses 10-13, wherein the plurality of images comprise a plurality of Optical Coherence Tomography (OCT) images.

Clause 15: The system of any of clauses 10-14, wherein the plurality of OCT images is from a plurality of different OCT imaging systems.

Clause 16: The system of any of clauses 10-15, wherein the outer surface comprises a shallowest tissue interface of the eye.

Clause 17: The system of any of clauses 10-16, wherein the modified image comprises a pre-segmented image.

Clause 18: The system of any of clauses 10-17, wherein the computing device is further programmed or configured to process the pre-segmented image with at least one segmentation algorithm.

Clause 19: A computer program product for removing noise and/or artifacts from an image, comprising a computing device programmed or configured to: train a generative adversarial network (GAN) based on a plurality of images, the plurality of images comprising at least one undesired element comprising at least one of the following: noise, speckle patterns, artifacts, or any combination thereof; and generate a modified image based on processing an image of an eye or other object with the GAN to remove the at least one undesired element from the image that is above an outer surface of the eye or other object. These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1A:
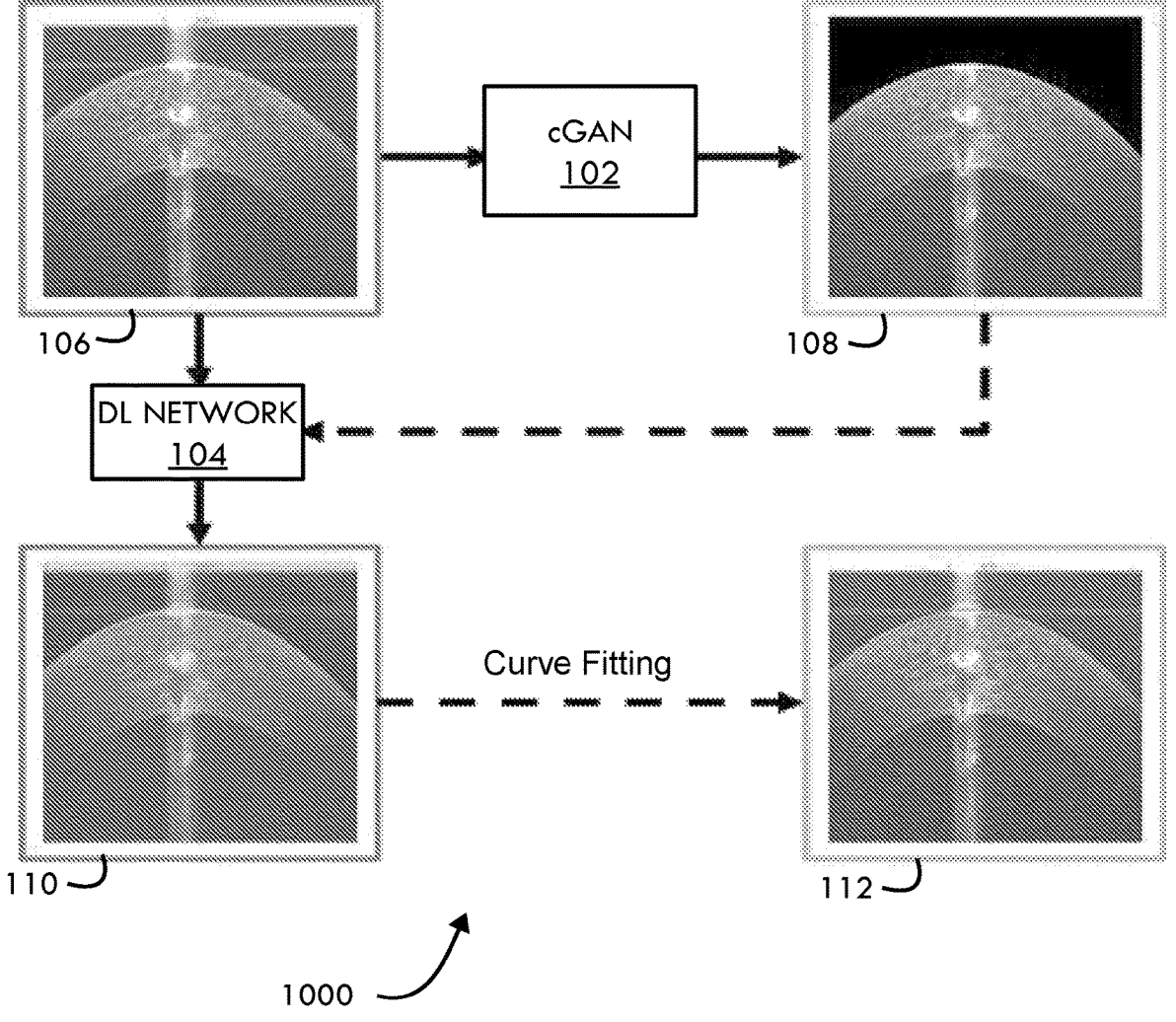
FIG. 1A illustrates a system for removing noise and/or artifacts from an OCT image according to non-limiting embodiments.

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include an AI accelerator, including an application-specific integrated circuit (ASIC) neural engine such as Apple's "Neural Engine" or Google's TensorFlow processing unit. In non-limiting embodiments, a computing device may be comprised of a plurality of individual circuits representing each connection in a neural network such that each circuit is configured to weigh inputs from each node in a neural network. In such an arrangement, logic gates may be used without needing software, a processor, or memory.

Non-limiting embodiments of the disclosure are directed to a system and method for removing undesired image elements (e.g., noise and/or artifacts) from an OCT image using a GAN and/or segmenting ocular layers of an OCT image using a GAN. Although the examples described herein relate to the processing of OCT images, it will be appreciated that the techniques and methods described herein may be used to process other types of input data. Undesired image elements (e.g., noise and/or artifacts) may include, for example, specular reflections, saturated pixels, speckles (including speckles created by sub-resolution scatters interacting with an OCT optical beam), shadowing artifacts, noise from low signal-to-noise-ratio (SNR) in regions with low-signal (including due to off-angle reflection, shadowing, occlusion, imaging too deep through too much scattering tissue, etc.), various spatial artifacts created by the presence of any artifacts in frequency-space, artifacts from turbulence in ocular fluid, motion artifacts, geometric artifacts from tear-film adherence to corneal lesions, and/or the like.

In non-limiting embodiments, a GAN is used to remove noise and artifacts from OCT images. By training a discriminator with data from actual images (potentially including annotated/pre-processed actual images) in addition to a generator that generates images, noise and artifacts may be removed from the air-gap in anterior segment OCT images (e.g. cornea, limbus, and white sclera), effectively pre-segmenting the OCT images. Non-limiting embodiments allow for a more accurate segmentation of ocular layers, which in turn enables more accurate registration of adjacent image slices (to compensate for intra-slice motion, e.g., from a patient's uncontrolled eye movements and/or tremor from a hand-held OCT scanner). Non-limiting embodiments provide for a GAN-based removal of noise and artifact to pre-segment the outer layer and therefore improve the accuracy of any subsequent segmentation algorithms that may be used to segment the image (for example, to segment corneal interfaces).

Attempts to use a GAN to remove speckle noise in retinal OCT images have relied on an absence, or limited amount of, eye motion between frames during image capture. The ground truth data for such a GAN was generated using a compounding technique in which the same tissue area was imaged multiple times, and individual volumes were registered yielding averaged B-scans for training. However, this proposed methodology to generate ground truth data for training is not feasible as corneal datasets exhibit large motion when acquired in-vivo, which makes registration and compounding technologically challenging, resource intensive, and potentially inaccurate. In addition, existing research databases, from which corneal datasets can be extracted for use in algorithmic development, rarely contain multiple scans of the same tissue area for compounding.

Non-limiting embodiments described herein provide for a system and method to remove undesired image elements, such as noise and/or artifacts, from an OCT image that mitigates severe specular artifacts just above the shallowest tissue interface in anterior segment OCT images, and is able to accurately identify the interface. This is achieved in non-limiting embodiments with a cascaded neural network framework, including a conditional Generative Adversarial Network (cGAN) and a Tissue Interface Segmentation Network (TISN). Both the cGAN and TISN may be implemented using Convolutional Neural Network (CNN) approaches. The cGAN pre-segments OCT images by removing undesired specular artifacts and speckle noise patterns just prior to the shallowest and most visible tissue interface boundary. Following pre-segmentation, the TISN predicts the final segmentation using both the original and pre-segmented images, and the shallowest tissue interface is extracted and fitted with a curve. Applied to corneal datasets acquired using two (or more) different OCT systems and different scan protocols, in addition to limbal datasets, non-limiting implementations of the systems and methods described herein produced improved OCT images with less noise and artifacts. Non-limiting implementations reduced the segmentation error of a traditional image analysis-based algorithm, accurately segmented the shallowest interface in corneal datasets, and accurately segmented the interface precisely in a majority of the limbal datasets. Moreover, non-limiting embodiments described herein are applicable to a variety of different datasets displaying varying degrees of specular noise, artifacts, and bulk tissue motion.

Non-limiting embodiments of the cGAN described herein result in improved OCT images that can be more efficiently and optimally processed by other algorithms, such as a TISN or other deep learning network or other classical or machine-learning algorithm(s), for example to segment tissue interfaces. These advantages and benefits result from the new and unique system architecture and algorithms described herein. Moreover, non-limiting embodiments described herein result in improved segmentation of tissues (e.g., identification and classification of different tissue structures) in an OCT image.

Referring now to FIG. 1A, shown is a system 1000 to remove noise and/or artifacts from an OCT image according to non-limiting embodiments. The system 1000 includes a cGAN 102 implemented with one or more computing devices and a TISN 104 also implemented with one or more computing devices. An input OCT image 106 is input to the cGAN 102 which outputs a pre-segmented image 108. In the pre-segmented image 108, background pixels (e.g., corresponding to speckle noise patterns and specular artifacts) just prior to the shallowest tissue interface are eliminated, and the region below the interface is left intact. For example, the pre-segmented OCT image may be an enhanced OCT image in which the values of the pixels corresponding to noise and/or artifacts are set to a specific value (e.g., "0" for black). The region above the tissue interface may not be significant for segmenting the tissue, and in the case of specular artifacts, hinders the extraction of the true tissue boundary.

Still referring to FIG. 1A, the pre-segmented OCT image 108 is then input to the TISN 104. The TISN 104 outputs a segmented image 110 showing the location of the shallowest interface by generating a binary segmentation 110 (overlaid on the original image with a false color overlay). The segmented image 110 is then processed with one or more curve fitting algorithms to determine one or more curves that fit the detected interface. A final segmented image 112 is output showing the curve as a series of labeled pixels, a vector line, and/or the like.

Figure 1B:
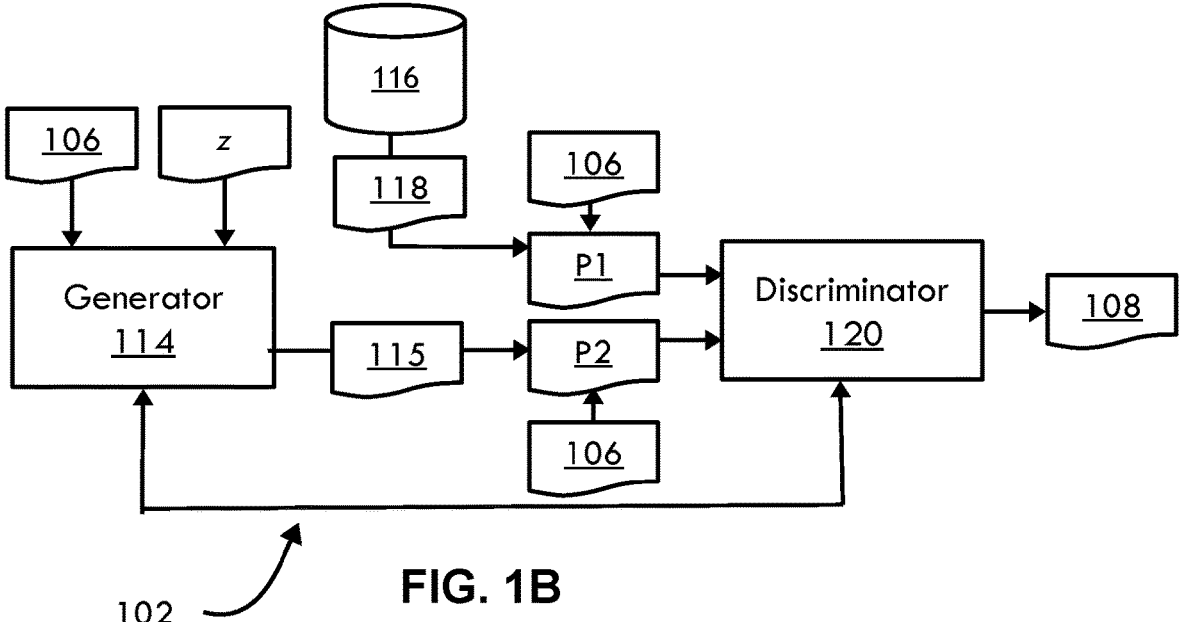
FIG. 1B illustrates a cGAN used in a system for removing noise and/or artifacts from an OCT image according to non-limiting embodiments.

Referring now to FIG. 1B, a cGAN 102 is shown according to a non-limiting embodiment. The cGAN includes a generator 114 and a discriminator 120. The generator 114 and discriminator 120 may include software and/or hardware for performing programmed instructions. For example, the generator 114 and discriminator 120 may each be software functions executed by one or more computing devices. A data storage device 116 stores a desired output 118 (e.g., a gold standard output) which may be an image cleaned of noise and/or artifacts. The desired output 118 may vary based on the variability of multiple human experts cleaning and/or labeling images. Accordingly, the desired output 118 may be one or more images or combinations of images used for comparison. The data storage device 116 may store one or more images that vary in representation to the desired output 118. An input image 106 may be, for example, an OCT image having noise and/or artifacts. The cGAN 102 is a GAN that is made conditional by using the input image 106 as a condition input into the discriminator 120. In this example, the condition input is used to generate pairs P1, P2.

With continued reference to FIG. 1B, the cGAN 102 is configured to determine a function $F_G$: {I,z}→P that learns to map every pixel in an input image 106, using a random noise vector z, to a predicted image (e.g., pre-segmented output image) 115 (P in the above function) where pixels just prior to the tissue interface (e.g., corneal interface) are set to a value (e.g., "0" for black). For example, the generator 114 is trained to generate a predicted image and, in operation, receives as inputs the input image 106 and a random noise vector z. Based on these inputs the generator 114 generates a predicted image 115 that is based on a similarity to the desired output 118. In this example, the predicted image 115 is generated to remove noise and/or artifacts from the input image 106 (e.g., to generate a modified image excluding pixels having noise and/or artifacts and replacing the pixels with black or other pixels). The input image 106 is then paired with both the predicted image 115 and the desired output 118 and the two pairs P1, P2 are input to the discriminator 120.

Still referring to FIG. 1B, the discriminator 120 is configured to determine which pair of images P1, P2 most accurately represents the desired output 118. The discriminator 120 may, for example, output a probability that each pair of images P1, P2 is real or fake. The output may be communicated back to the generator 114. In some non-limiting embodiments, a Markovian discriminator may be used to process arbitrarily sized images with only specific patches of the image being considered (e.g., p×p pixels). Pixels outside of such a patch may be independent from those in each current, local batch being considered at the time. The discriminator 120, in considering the pairs P1, P2, may penalize the loss of texture (e.g., deviations from the desired output when the generator 114 incorrectly removed high frequency structural information, such as edges and boundaries, from the input image).

Still referring to FIG. 1B, the generator 114 attempts to generate a predicted image 115 that closely resembles the desired output 118 to convince the discriminator 120 that the predicted image 115 is the desired output 118. The discriminator 120 and generator 114 are thus trained in conjunction. In an example of operation, the initial predicted image 115 generated by the generator 114 poorly resembles the desired output 118. However, over numerous iterations, the generator 114 learns to produce more realistic predicted images 115 by minimizing an objective function shown in Eq. (1) below:

$$G^* = \underset{G}{\arg\min}\,\underset{D}{\max}\,L_{cGAN}(G, D) + \lambda L_1(G) \qquad (1)$$

The discriminator 120 learns to maximize the objective function by accurately distinguishing the generated predicted image 115 from the most desired image 118. The objective function comprises two losses: $L_{cGAN}$ in Eq. (2), and $L_1$ in Eq. (3), with $\lambda$ being a hyper-parameter to be learned. Eq. (2) and Eq. (3) are shown below:

$$L_{cGAN}(G, D) = [\log D(x, y_t)] + E_{x,z}[\log(1 - D(x, G(x, z))] \qquad (2)$$

$$L_1 = E_{x,y,z}[\|y - G(x, z)\|_1] \qquad (3)$$

The $L_1$ loss penalizes regions in the generated output that differ from the ground truth image provided (e.g., the desired output), thereby making the loss a "structured" loss that forces the output predicted image 115 of the generator 114 to be close to the image 118 in the $L_1$ sense. This loss results in less blurry outputs as opposed to the use of an original GAN formulation utilizing an $L_2$ loss.

Directly transferring a full cGAN implementation with the cGAN loss in Eq. (1) to sample OCT images may result in blurry generated predictions, wherein parts of the tissue boundary that need to be preserved are removed instead. In non-limiting embodiments, a task-specific weighted $L_1$ loss is utilized to mitigate the problem arising from the $L_1$ loss in Eq. 3 that equally penalizes all pixels in the image without imparting a higher penalty to the background pixels above the shallowest tissue interface. The task-specific weighted $L_1$ loss is defined by Eq. (4):

$$L_{w1} = E_{x,y,z}[\alpha w \circ \|y - G(x, z)\|_1 + (1 - w) \circ \|y - G(x, z)\|_1] \qquad (4)$$

This task-specific loss eliminates the speckle patterns and specular artifacts just prior to the shallowest tissue interface, thereby enabling tissue interfaces to be segmented accurately. The task-specific loss enforces the preservation of image details relating to tissue structure while also removing noise and/or artifacts above the interface in a context-aware manner. To achieve the preservation of pixels at the interface and below it, the task-specific loss function may incorporate a binary mask w, which imparts different weights to the foreground and background pixels. This mask may be generated from the gold standard (e.g., desired output) annotation of an expert grader for each image in the training datasets. In Eq. (4), o denotes the pixel-wise product, and $\alpha$ is the weight ratio for background to foreground. The first term in Eq. (4) weights the background pixels a times higher than the foreground pixels.

Figure 2:
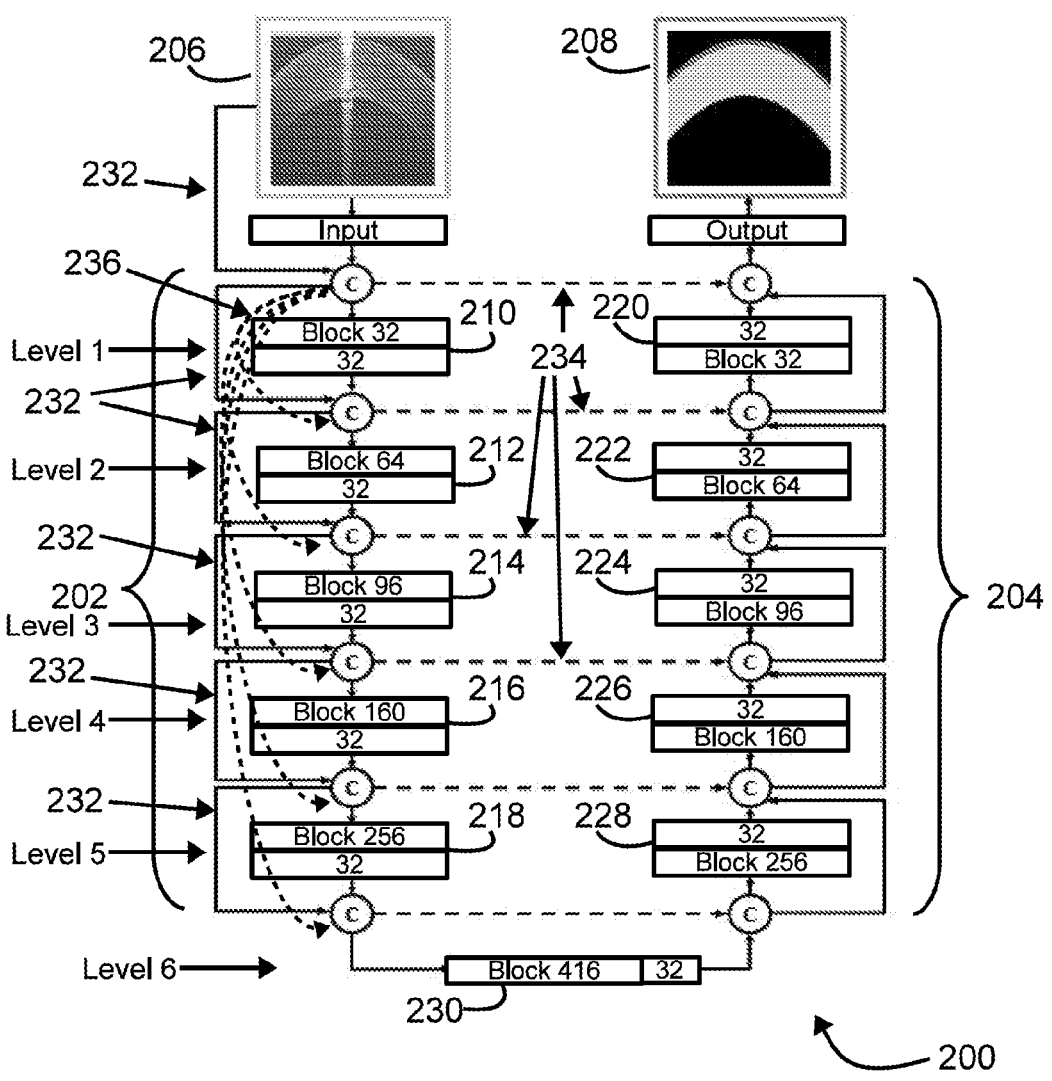
FIG. 2 illustrates a deep-learning network according to non-limiting embodiments.

Referring now to FIG. 2, a deep-learning network 200 is shown according to a non-limiting embodiment. The deep-learning network 200 may be the base network/model architecture for training the cGAN and the TISN. An input image 206 to the cGAN may be a single channel grayscale OCT image, for example, and an output image 208 may be a pre-segmented OCT image. The TISN may receive a two-channel input that includes the original input image 206 and the pre-segmented image output by the cGAN, and the output image 208 of the TISN may be a binary mask representing a final segmentation.

Referring now to FIG. 2, a deep-learning network 200 (e.g., deep-learning model) is shown according to a non-limiting embodiment. The deep-learning network 200 is enabled to combine both coarse and fine image details through the use of dense connections in both a contracting branch 202 and an expanding branch 204. In such dense connections, each block, layer, or level (e.g., Levels 1-6) is connected to all of its preceding blocks/layers/levels by feature map concatenation (depicted as a circled "C"), thereby allowing discernible features of faint boundaries to be retrieved across multiple scales. In non-limiting embodiments, the number of densely connected layers is limited to achieve computational efficiency. As an example, and as shown in FIG. 2, the deep-learning network 200 may include six (6) layers (e.g., Levels 1-6) of dense connections as a balance between accuracy (e.g., from more layers) and computational efficiency (e.g., from fewer layers). Further, in non-limiting embodiments, the deep-learning network 200 may utilize max pooling techniques to improve maintaining features of interest through the network layers as compared to average pooling and convolutions of stride techniques. In some non-limiting embodiments, the deep-learning network 200 may utilize nearest neighbor interpolation-based upsampling techniques followed by a 3×3 convolution, which provides better results than bilinear interpolation-based upsampling, bilinear interpolation with a 3×3 convolution, unpooling, and fractionally-strided convolutions.

With continued reference to FIG. 2, the deep-learning network 200 includes a contracting branch 202 and an expanding branch 204. The blocks of the contracting branch 202 represent downsampling computations and the blocks of the expanding branch 204 represent upsampling computations. The network predicts an output for each slice of a set of slices of dimensions and the slices are aligned to recreate the original input dimension. In non-limiting embodiments, block 230 does not perform upsampling but functions as a bottleneck of the network and is configured to generate feature maps of the same dimensions as the output feature maps from the previous layer (e.g., block 218 in the contracting branch 202). The values (e.g., 32, 64, 96, 160, 256, 416) associated with each block 210-230 shown in the network 200 represent the number of feature maps output by each block. The difference in the number of feature maps from layer to layer in both branches 202, 204 shows a feature map growth rate that is based on a Fibonacci sequence of values.

Figure 3:
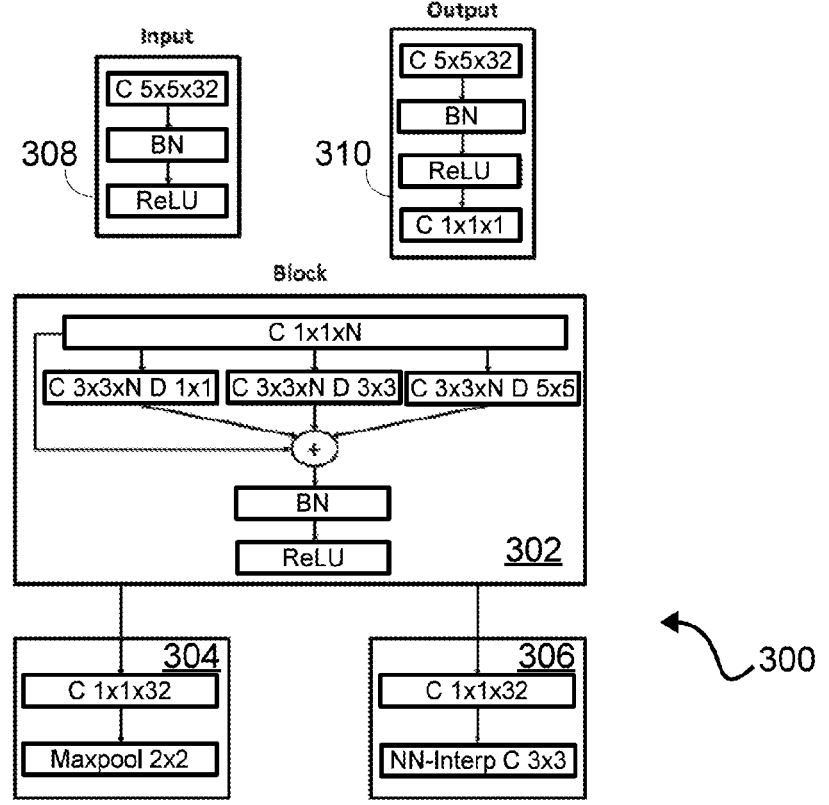
FIG. 3 illustrates a portion of a deep-learning network according to non-limiting embodiments.

Referring to FIG. 3, portions of the deep-learning network 200 shown in FIG. 2 are shown in more detail according to a non-limiting embodiment. In a block 302 of the deep-learning network 200, the value of the block 302 is calculated based on the previous layers as shown. The input 308 and output 310 of the network 200 are shown in FIG. 3 although the block 302 may be several layers removed from the input 308 and/or output 310. "C" refers to a convolution in the deep-learning network 200, "D" refers to a dilated convolution, and the value of "N" is equal to a number of feature maps. "BN" refers to a batch normalization function. A rectified linear activation unit (ReLU) follows the BN as a nonlinear activation function. Dilated convolutions gather contextual information about broader surrounding image content, such as surrounding tissue structure in an OCT image, to accurately segment object or tissue boundaries. As an example, dilated convolutions may "fill in" gaps to perform better than prior methods in regions where the contrast of tissue interface boundaries is poor.

In FIG. 3, the downsampling output 304 of block 302 (e.g., an output of block 302 in the contracting branch of the deep-learning network) is shown with a maxpooling function. The maxpooling function is used to determine the most discriminative features at the end of each downsampling layer. The use of maxpooling optimizes feature selection across the common downsampling choices. An upsampling output 306 of block 302 (e.g., an output of block 302 in the expanding branch of the deep-learning network) is shown with an interpolation function. The interpolation function, which may be a nearest neighbor interpolation, may be used with a convolution (e.g., a 3×3 convolution in this example) to upsample feature maps in the expanding branch of the deep-learning network.

As shown in FIGS. 2 and 3, in non-limiting embodiments, an unconventional neural network architecture is employed for image processing tasks that has advantages of a RES-NET (e.g., a residual neural network) architecture, a UNET architecture, and a Dense-NET architecture. Moreover, in non-limiting embodiments, dilated convolutions are combined with aspects of the aforementioned UNET, RESNET, and Dense-NET architectures.

Referring to the non-limiting examples shown in FIG. 2 and block 302 of FIG. 3, both residual and dense connections are contained within the set of individual solid arrows 232 on the left of FIG. 2 (and a similar set of solid arrows on the right). Residual connections are present in the solid arrows that directly connect the input of a layer or block to its output. Dense connections result from feature concatenation. For example, the concatenated set of solid arrows 232 contains each of the small-dashed curved arrows 236 representing dense connections from the input of block 210 to inputs of each of 212, 214, 216, 218, and 230. Many other dense connections between other pairs of blocks are also present within arrows 232, connecting each block to every other block before it (e.g., a connection from block 212 to each of blocks 214, 216, 218, a connection from block 214 to each of blocks 216 and 218, a connection from block 228 to each of blocks 226, 224, 222, 220, a connection from block 226 to each of blocks 224, 222, 220, a connection from block 224 to each of blocks 222 and 220, etc., none of which are shown in FIG. 2 for clarity). With reference to FIG. 2, the deep-learning network 200 also includes U-Net feature-forwarding connections 234 (shown as dashed straight lines with arrows) between blocks of the same layer in the downsampling branch 202 and upsampling branch 204. The use of feature concatenation also allows dense-type connections to be propagated through the feature-forwarding connections 234.

The residual components of connections allow a layer among a plurality of other layers in the unconventional neural network to learn the appearance of the tissue interface boundary, and (similarly to RESNET) encourage successive layers to distinguish appearances that have been visualized before and learn new tissue interface appearance information. Moreover, dense components of connections encourage the reuse of feature maps that have been computed previously in the unconventional neural network 200 to enable the network 200 to analyze the shape of the tissue interface boundaries. Similarly to Dense-NET, the dense connections improve gradient information flow and prevent or limit over-fitting. Dense connections differ from residual connections in that residual connections sum the feature maps acquired from the various convolutional operations (dilated or non-dilated) within a layer and the preceding layer. Dense connections, however, promote the concatenation of feature maps from multiple previous layers to a current layer and flow through and/or across several blocks in the network unmodified. For example, in non-limiting embodiments, dense connections may be established through both the downsampling and upsampling branches of the deep-learning network 200.

Combining residual connections and dense connections into a UNET deep-learning architecture results in numerous parameters to be optimized (e.g., a parameter explosion), which increases the demand for computational resources. Non-limiting embodiments of the deep-learning network 200 mitigate this concern by limiting the number of channels and connections in the network 200 and adding bottlenecks (e.g., such as block 230).

Figure 4:
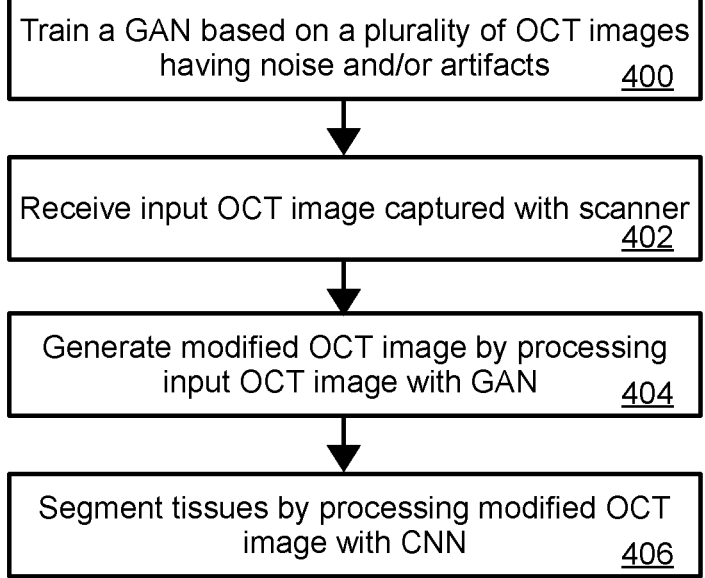
FIG. 4 is a flow diagram of a method for removing noise and/or artifacts from an OCT image according to non-limiting embodiments.

Referring now to FIG. 4, shown is a method for removing noise and/or artifacts from an OCT image according to non-limiting embodiments. It will be appreciated that the order of the steps shown in FIG. 4 is for illustration purposes only and that non-limiting embodiments may involve more steps, fewer steps, different steps, and/or a different order of steps. Moreover, the example shown in FIG. 4 relates to OCT images but, as explained herein, the systems and methods disclosed herein may be used in other contexts to remove noise and/or artifacts from a variety of images.

At step 400, a GAN is trained based on a plurality of OCT images having noise and/or artifacts. Using a deep learning network, such as the non-limiting example shown in FIG. 2, a GAN may be trained with a two-channel input that includes the input OCT image (corresponding to a first channel) and a binary mask (corresponding to a second channel). As an example, training may performed as described herein using $\lambda=100$ and $\alpha=10$ in a final objective function. The network parameters may be optimized using an ADAM optimizer, as an example. A portion of the input data (e.g., 90%) may be used for training while the remaining (e.g., 10%) may be used to validate the GAN. As an example, the network may be trained for 100 epochs with the learning rate set to $2\times10^{-3}$. In order to prevent the GAN from over-fitting to the training data, early stopping may be applied when the validation loss does not decrease for a set number of epochs (e.g., 10 epochs). At the last layer of the generator, a convolution operation, followed by a Tan H activation, may be used to convert the final feature maps into the desired output (e.g., a pre-segmented image) with pixel values mapped to the range of [−1, 1]. It will be appreciated that the GAN may be trained in various ways.

At step 402, an input OCT image is received. The input OCT image may be received from an OCT scanner or another system. As an example, a computing device local to and/or remote from an OCT scanner may receive the input OCT image over a network or other connection. In some non-limiting examples, a computing device internal to the OCT scanner may be used such that the OCT scanner outputs a modified OCT image having noise and/or artifacts removed. In some non-limiting embodiments, an OCT scanner may acquire a volume containing both corneal and limbal regions, e.g. by starting a scan by imaging the limbus, crossing over the limbal junction, and then imaging the cornea.

At step 404, a modified OCT image is generated by processing the input OCT image with the GAN. As explained herein, the modified OCT image may be based on changing pixel values in the original input OCT image. For example, a plurality of background pixels corresponding to a speckle pattern (e.g., noise) and/or a specular artifact may be identified. In some non-limiting embodiments, weights may be applied to background pixels and foreground pixels. In some examples, the background pixels (e.g., pixels representing undesired elements that are positioned above the shallowest tissue interface boundary from the perspective of the image) may be weighed more than the foreground pixels (e.g., pixels representing part of the eye including the tissue interface and elements of the eye below the interface). In some non-limiting embodiments, the background pixels (e.g., pixels just prior to the tissue interface) may be set to a specified value (e.g., "0" for black) and the foreground pixels (e.g., pixels including the tissue interface and other elements of the eye) may be set to another specified value (e.g., "1"). It will be appreciated that other methods may be used to generate a modified OCT image, such as inserting flags or other indicators into the image data to mark pixels or regions of an image.

The result of step 404 is a modified OCT image that allows for more efficient and accurate subsequent processing steps. For example, the modified OCT image may be input to a TISN as described herein to segment the corneal tissue. In FIG. 4, subsequent step 406 may therefore include segmenting tissue structures in the OCT image by processing the modified OCT image with a CNN, such as a TISN. Although step 406 is shown in FIG. 4, it will be appreciated that the method may end with the generation of the modified OCT image. For example, the modified OCT image having noise and/or artifacts removed may be stored in a database for later retrieval, review, and/or the like.

Figure 5:
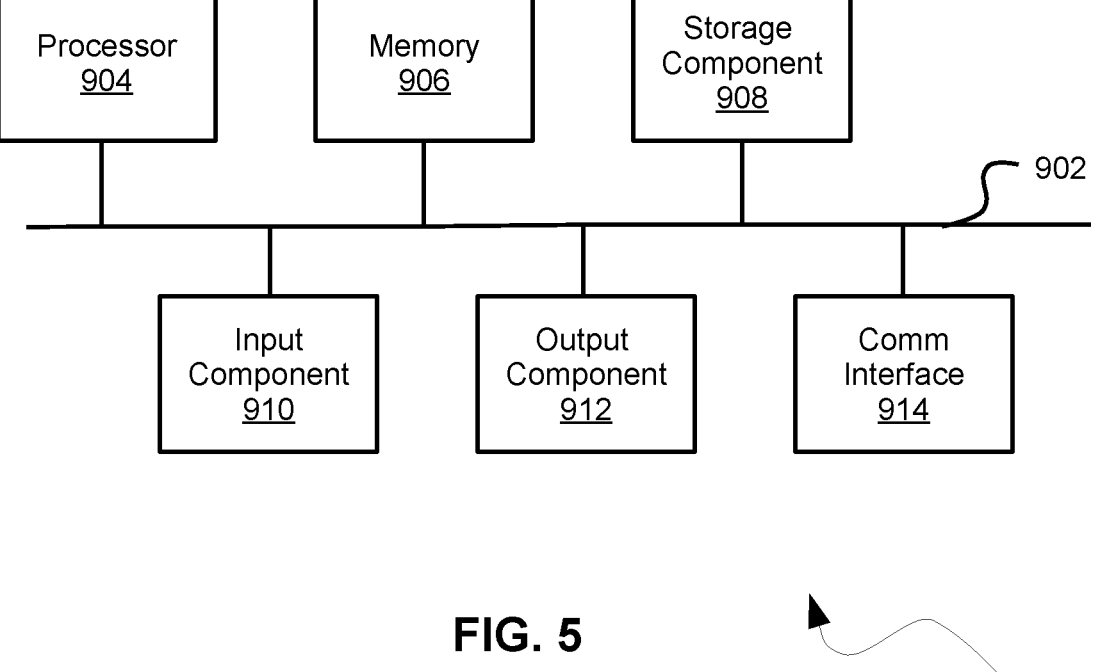
FIG. 5 Illustrates example components of a computing device used in connection with non-limiting embodiments.

Referring now to FIG. 5, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 5. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for removing noise and/or artifacts from an image, comprising:

training a generative adversarial network (GAN) based on a plurality of medical images, the plurality of medical images comprising at least one undesired element comprising at least one of the following: noise, speckle patterns, artifacts, or any combination thereof;

generating a pre-segmented medical image by inputting a medical image into the GAN to pre-segment an outer layer of an object in the medical image, the pre-segmented medical image removing or labeling at least one undesired element prior to the shallowest tissue interface of the object; and generating a segmented medical image based on processing the pre-segmented medical image output by the GAN and the medical image with a segmentation network, the segmentation network configured to segment at least one object in the medical image based on the pre-segmented medical image, wherein the segmentation network is a different network than the GAN.

2. The method of claim 1, wherein generating the segmented medical image comprises identifying a plurality of background pixels corresponding to the at least one undesired element.

3. The method of claim 1, wherein the GAN is configured to assign different weights to foreground pixels and background pixels.

4. The method of claim 3, wherein the background pixels are weighed more than the foreground pixels.

5. The method of claim 1, wherein the plurality of medical images comprises a plurality of Optical Coherence Tomography (OCT) images.

6. The method of claim 5, wherein the plurality of OCT images is from a plurality of different OCT imaging systems.

7. The method of claim 1, wherein the at least one undesired element is beneath an outer surface of an eye, the outer surface comprising the shallowest tissue interface.

8. The method of claim 1, further comprising processing the pre-segmented medical image with at least one segmentation algorithm.

9. A system for removing noise and/or artifacts from an image, comprising a computing device programmed or configured to:

train a generative adversarial network (GAN) based on a plurality of medical images, the plurality of medical images comprising at least one undesired element comprising at least one of the following: noise, speckle patterns, artifacts, or any combination thereof;

generate a pre-segmented medical image by inputting a medical image into the GAN to pre-segment an outer layer of an object in the medical image, the pre-segmented medical image removing or labeling at least one undesired element prior to the shallowest tissue interface of the object; and generate a segmented medical image based on processing the pre-segmented medical image and the medical image with a segmentation network, the segmentation network configured to segment at least one object in the medical image, wherein the segmentation network is a different network than the GAN.

10. The system of claim 9, wherein generating the segmented medical image comprises identifying a plurality of background pixels corresponding to the at least one undesired element.

11. The system of claim 9, wherein the GAN is configured to assign different weights to foreground pixels and background pixels.

12. The system of claim 11, wherein the background pixels are weighed more than the foreground pixels.

13. The system of claim 9, wherein the plurality of medical images comprises a plurality of Optical Coherence Tomography (OCT) images.

14. The system of claim 13, wherein the plurality of OCT images is from a plurality of different OCT imaging systems.

15. The system of claim 9, wherein the at least one undesired element is beneath an outer surface of an eye, the outer surface comprising the shallowest tissue interface.

16. The system of claim 9, wherein the computing device is further programmed or configured to process the pre-segmented medical image with at least one segmentation algorithm.

17. A computer program product for removing noise and/or artifacts from an image, comprising at least one non-transitory computer-readable medium comprising program instructions that, when executed by a computing device, cause the computing device to:

train a generative adversarial network (GAN) based on a plurality of medical images, the plurality of medical images comprising at least one undesired element comprising at least one of the following: noise, speckle patterns, artifacts, or any combination thereof; 5 generate a pre-segmented medical image by inputting a medical image into the GAN to pre-segment an outer layer of an object in the medical image, the pre-segmented medical image removing or labeling at least one undesired element prior to the shallowest tissue 10 interface of the object; and generate a segmented medical image based on processing the pre-segmented medical image and the medical image with a segmentation network, the segmentation network configured to segment at least one object in the 15 medical image, wherein the segmentation network is a different network than the GAN.

* * * * *